(12) United States Patent
Nilsson

(10) Patent No.: US 6,238,468 B1
(45) Date of Patent: May 29, 2001

(54) QUENCH VESSEL

(75) Inventor: Bengt Nilsson, Skoghall (SE)

(73) Assignee: Kvaerner Pulping AB, Karlstad (SE)

( * ) Notice: Subject to any disclaimer, the term of this patent is extended or adjusted under 35 U.S.C. 154(b) by 0 days.

(21) Appl. No.: 09/264,565

(22) Filed: Mar. 8, 1999

Related U.S. Application Data

(60) Division of application No. 08/850,349, filed on May 2, 1997, now Pat. No. 6,027,609, which is a continuation-in-part of application No. PCT/SE95/01219, filed on Oct. 18, 1995.

(30) Foreign Application Priority Data

Nov. 4, 1994 (SE) .................................................. 9403786
Oct. 18, 1995 (SE) ...................................... PCTSE9501219

(51) Int. Cl.[7] .................................................. B01D 47/02
(52) U.S. Cl. ................................. 96/350; 95/226; 96/351
(58) Field of Search ............................... 95/226; 96/269, 96/278, 279, 329, 333, 335, 339, 340, 342, 346, 348, 349, 350, 351

(56) References Cited

U.S. PATENT DOCUMENTS

| | | | |
|---|---|---|---|
| 3,061,993 | * 11/1962 | Gustavsson | 96/349 |
| 3,841,962 | 10/1974 | Procter et al. | |
| 3,998,609 | * 12/1976 | Crouch et al. | 96/351 |
| 4,005,999 | * 2/1977 | Carlson | 95/226 |
| 4,300,924 | * 11/1981 | Coyle | 96/351 |
| 4,439,215 | * 3/1984 | Rawicki | 95/226 |
| 4,494,963 | * 1/1985 | Reich | 96/351 |
| 4,650,497 | * 3/1987 | Quintana | 96/351 |
| 4,705,542 | * 11/1987 | Gilmer | 95/226 |
| 4,778,483 | * 10/1988 | Martin et al. | 96/351 |
| 4,808,264 | 2/1989 | Kignell . | |
| 4,828,578 | * 5/1989 | Den Bleyker | 96/351 |
| 4,828,579 | * 5/1989 | Blecker | 96/322 |
| 5,326,433 | 7/1994 | Ryham . | |
| 5,397,381 | * 3/1995 | Keintzel et al. | 95/226 |
| 5,405,496 | 4/1995 | Hedblom . | |
| 5,509,997 | 4/1996 | Kuusio . | |
| 5,520,714 | * 5/1996 | Muschelknautz | 95/226 |
| 5,660,685 | 8/1997 | Nilsson . | |
| 5,873,930 | * 2/1999 | Sanchez | 96/333 |
| 6,004,379 | * 12/1999 | Wallace et al. | 96/280 |
| 6,027,609 | * 2/2000 | Nilsson | 162/30.1 |
| 6,113,739 | 9/2000 | Nilsson . | |

FOREIGN PATENT DOCUMENTS

| | | |
|---|---|---|
| 42 04 088 A1 | 8/1992 | (DE) . |
| 8502731-6 | 1/1987 | (SE) . |
| 465039 | 7/1991 | (SE) . |
| 468600 | 2/1993 | (SE) . |
| 9402197 | 6/1994 | (SE) . |
| 502038 | 7/1995 | (SE) . |
| WO 86/07396 | 12/1986 | (WO) . |
| WO 93/12288 | 6/1993 | (WO) . |
| WO 96/14468 | 5/1996 | (WO) . |

* cited by examiner

Primary Examiner—Duane S. Smith
(74) Attorney, Agent, or Firm—Jeffrey S. Melcher; Manelli, Denison & Selter, PLLC

(57) ABSTRACT

Provided is a quench vessel having a cooling structure in which a combustion gas is forced down and through a cooling liquid a plurality of times.

10 Claims, 3 Drawing Sheets

QUENCH VESSEL

This application is a Divisional of U.S. Ser. No. 08/850,349, filed on May 2, 1997, which is now U.S. Pat. No. 6,027,609, is a continuation-in-part of international patent application No. PCT/SE95/01219, filed on Oct. 18, 1995, and claims priority to Swedish patent application No. 940378608, filed on Nov. 4, 1994, the complete disclosures of which are incorporated herein by reference.

1. Technical Field

The present invention provides a novel process for recovering chemicals and energy from a spent liquor obtained from production of pulp. The present invention also provides a novel recovery installation for recovering chemicals and energy from a spent liquor obtained from the production of pulp.

2. Background of the Invention

When producing paper pulp by the kraft method, a spent liquor is obtained, which is generally called black liquor. The black liquor contains organic material and the residual chemicals from digesting the fibrous raw material. This black liquor is generally evaporated and conveyed to a separate processing stage for recovery of the energy content of the organic material and also for recovery of the cooking chemicals. The cooking chemicals are usually recovered in a liquor, called green liquor. The well known Tomlinson process has been the commercially predominant method for this recovery of energy and chemicals. However, a disadvantage of the Tomlinson process is that it requires very large combustion furnaces which are complicated from the technical and operational points of view.

Swedish Patent SE-C-448 173 describes a more modern process which, in addition to considerably simplifying the necessary process equipment, achieves improved recovery of both energy and chemicals. This process is based on a pyrolysis reaction in which the black liquor is gasified in a Chemrec® reactor. The process produces an energy-rich gas principally comprising carbon monoxide, carbon dioxide, methane, hydrogen and hydrogen sulphide. Inorganic chemicals are also produced in the form of small drops of smelt, principally comprising sodium carbonate, sodium hydroxide and sodium sulphide. The resulting mixture of gas and drops of smelt is quickly cooled in a first stage by direct contact with a cooling liquid. Green liquor is formed when the smelt chemicals and the hydrogen sulphide are dissolved in the cooling liquid. The gas is thereafter washed in a second stage in a scrubber type gas washer. The gas is then used as fuel for generating steam and/or electrical power. The physical thermal value of the gas can also be used when the gas is cooled from the gasification temperature to the saturation temperature for producing steam at the selected pressure. The green liquor which is formed is conveyed to a causticizing stage for production of white liquor.

SE-B-468 600 discloses a process for producing white liquor of high sulphidity (a high proportion of sodium hydrogen sulphide in relation to the proportion of sodium hydroxide) directly from the gasification reactor and without any need for causticizing. In this process, hydrogen sulphide is recovered from the gaseous phase exhausted in the Chemrec® reactor and is returned to the reactor in order to be present during the thermal decomposition of the spent liquor. In this way, such a high partial pressure of hydrogen sulphide is established in the gasification stage that the following equilibrium reaction (a)

$$Na_2CO_3+H_2S \rightarrow Na_2S+CO_2+H_2O \qquad (a)$$

is displaced so far to the right that the formation of $Na_2CO_3$ is substantially suppressed. The $Na_2S$ formed is dissociated to form NaOH and NaHS.

The recovery of hydrogen sulphide from the gaseous phase takes place by passing the gas through a gas washer containing an external absorption chemical, for example N-methyl-pyrrolidone or methyidiethylamine, for selective and regernative absorption of the $H_2S$ present in the gas. The requirement for such an external chemical represents a significant disadvantage of this process and additionally makes it necessary to provide an undesirable regeneration stage for driving off the hydrogen sulphide from the absorption chemical.

Swedish Patent SE-C465 039 describes a method which has the object of producing a cooking liquor having a high sulphidity. Material containing sulphur and/or material containing sulphur and sodium, which generally occur in the pulp mill, are conveyed to a reactor together with the black liquor.

A general disadvantge of previously known recovery techniques is that the recovery of chemicals has been governed by the available process technology. For example, the sulphidity of the white liquor has been adapted to the requirements of the recovery boiler and not to the requirements of the cooking department. Nor has there been any commercially feasible technique for producing liquors having differing properties for different uses in the pulp mill.

SUMMARY OF THE INVENTION

An objective of the present invention is to recover valuable chemicals from a spent liquor in a flexible process that is capable of producing multiple liquors containing different concentrations of the recovered valuable chemicals.

Another objective of the present invention is to provide a flexible process by which the sulphidity of the white liquor can be easily adjusted to provide white liquors having different levels of sulphidity. In this manner, white liquors can be easily tailored for different uses in the pulp mill.

A further objective of the present invention is to provide a recovery installation that is adapted to produce liquors having different concentrations of recovered valuable chemicals, including different levels of sulphidity.

A further objective of the present invention is to provide a method and recovery installation for producing white liquors having different concentration of recovered chemicals in which the need for causticizing is significantly reduced or even substantially avoided.

The above objectives and other objectives can be surprisingly be obtained by the following. The invention provides a process for producing liquors containing different concentrations of recovered process chemicals or combustion gasses containing different concentrations of process chemicals from a spent liquor obtained from the production of pulp, said method comprising the steps of:

gasifying a portion of the spent liquor in a first reactor under a first set of reaction conditions to produce a first smelt and a first combustion gas having a first concentration of process chemicals;

dissolving said first smelt in a first aqueous liquid to produce a first liquor having a first concentration of process chemicals;

gasifying a portion of the spent liquor in a second reactor under a second set of reaction conditions to produce a second smelt and a second combustion gas having a second concentration of process chemicals;

dissolving said second smelt in a second aqueous liquid to produce a second liquor having a second concentration of process chemicals, wherein said first set of reaction conditions is selected to be different from said second set of reaction conditions such that at least one of said first concentration of process chemicals in said first combustion gas or said first liquor being different from said second concentration of process chemicals in said second combustion gas or said second liquor.

The invention also provides process for producing liquors containing different concentrations of process chemicals or combustion gasses containing different concentrations of process chemicals from a spent liquor obtained from the production of pulp, said method comprising the steps of:

gasifying a portion of the spent liquor in a first reactor at a first pressure and first temperature to produce a first smelt and a first combustion gas having a first concentration of recovered process chemicals;

dissolving said first smelt in a first aqueous liquid to produce a first liquor having a first concentration of process chemicals;

gasifying a portion of the spent liquor in a second reactor at a second pressure and second temperature to produce a second smelt and a second combustion gas having a second concentration of process chemicals;

dissolving said second smelt in a second aqueous liquid to produce a second liquor having a second concentration of process chemicals, wherein at least one of said second pressure or said second temperature is selected to be different from said first pressure or said first temperature such that at least one of said first concentration of process chemicals in said first combustion gas or said first liquor being different from said second concentration of process chemicals in said second combustion gas or said second liquor.

The invention further provides a pulp-mill recovery installation for producing liquors containing different concentrations of recovered process chemicals or combustion gasses containing different concentrations of process chemicals from a spent liquor obtained from the production of pulp. The installation comprises:

a first gasification reactor for gasifying a portion of a spent liquor and producing a first combustion gas and a first smelt;

a first quench vessel connected to said first reactor, said first quench vessel being constructed and arranged to provide contact between a cooling liquid and said first smelt to form a first liquor;

a second gasification reactor for gasifying said spent liquor and producing a second combustion gas and a second smelt;

a second quench vessel connected to said second reactor, said second quench vessel being constructed and arranged to provide contact between a cooling liquid and said second smelt to form a second liquor;

an apparatus for recovering at least one process chemical from at least one of said first or second combustion gasses or said first or second liquors, said apparatus for recovering being constructed and arranged to supply said recovered process chemical to at least one of following:

(i) a reactor different from the reactor that produced the combustion gas or liquor from which said process chemical was recovered;

(ii) the reactor which produced the combustion gas or liquor from which said process chemical was recovered;

(iii) an apparatus for processing a liquor produced by a reactor different from the reactor that produced the combustion gas or liquor from which said process chemical was recovered;

(iv) an apparatus for processing a combustion gas produced by a reactor different from the reactor that produced the combustion gas or liquor from which said process chemical was recovered; or (v) a liquor or combustion gas produced by a reactor different from the reactor that produced the combustion gas or liquor from which said process chemical was recovered.

The invention further provides a pulp-mill recovery installation for producing liquors containing different concentrations of recovered process chemicals from a spent liquor obtained from the production of pulp the installation comprises:

a first gasification reactor for gasifying a portion of a spent liquor and producing a first combustion gas and a first smelt;

a first quench vessel connected to said first reactor, said first quench vessel being constructed and arranged to provide contact between a cooling liquid and said first smelt to form a first liquor, wherein said first quench vessel is constructed and arranged to minimize contact between said first combustion gas and said first liquor;

a second gasification reactor for gasifying said spent liquor and producing a second combustion gas and a second smelt; and a second quench vessel connected to said second reactor, said second quench vessel being constructed and arranged to provide contact between a cooling liquid and said second smelt to form a second liquor, wherein said second quench vessel is constructed and arranged to maximize contact between said second combustion gas and said second liquor.

The invention also provides a quench vessel for forming a liquor from combustion products of a spent liquor, said quench vessel comprising:

a vessel structure defining an interior chamber for containing a pool of liquid comprising a liquor;

a dip-tube constructed to open a set distance below the surface of said pool of liquid for suppling a combustion gas from a reactor to said pool of liquid; and at least one diverter being constructed and arranged such that said combustion gas flowing through said dip-tube flows up through and out of said pool of liquid and then is forced to flow back into and out of said pool of liquid by said diverter, said diverter comprising:

a first wall structure adjacent to an outer surface of said dip-tube and extending less than said set distance below the surface of said pool of liquid to define an up-tube space between said outer surface of said dip-tube and an inner surface of said first wall structure through which said combustion gas flows upwards and out of said pool of liquid, and a second wall structure adjacent to an outer surface of said first wall structure and extending less than a distance said first wall structure extends below the surface of said pool of liquid to define an down-tube space between said outer surface of said first wall structure and an inner surface of said second wall structure through which said combustion gas flows downwards and into said pool of liquid, an upper portion of said second wall structure defining a surface for enclosing a gas space above said pool of liquid between said outer surface of said dip-tube and an inner surface of said second wall structure.

DETAILED DESCRIPTION OF PREFERRED EMBODIMENTS

Figure 1:
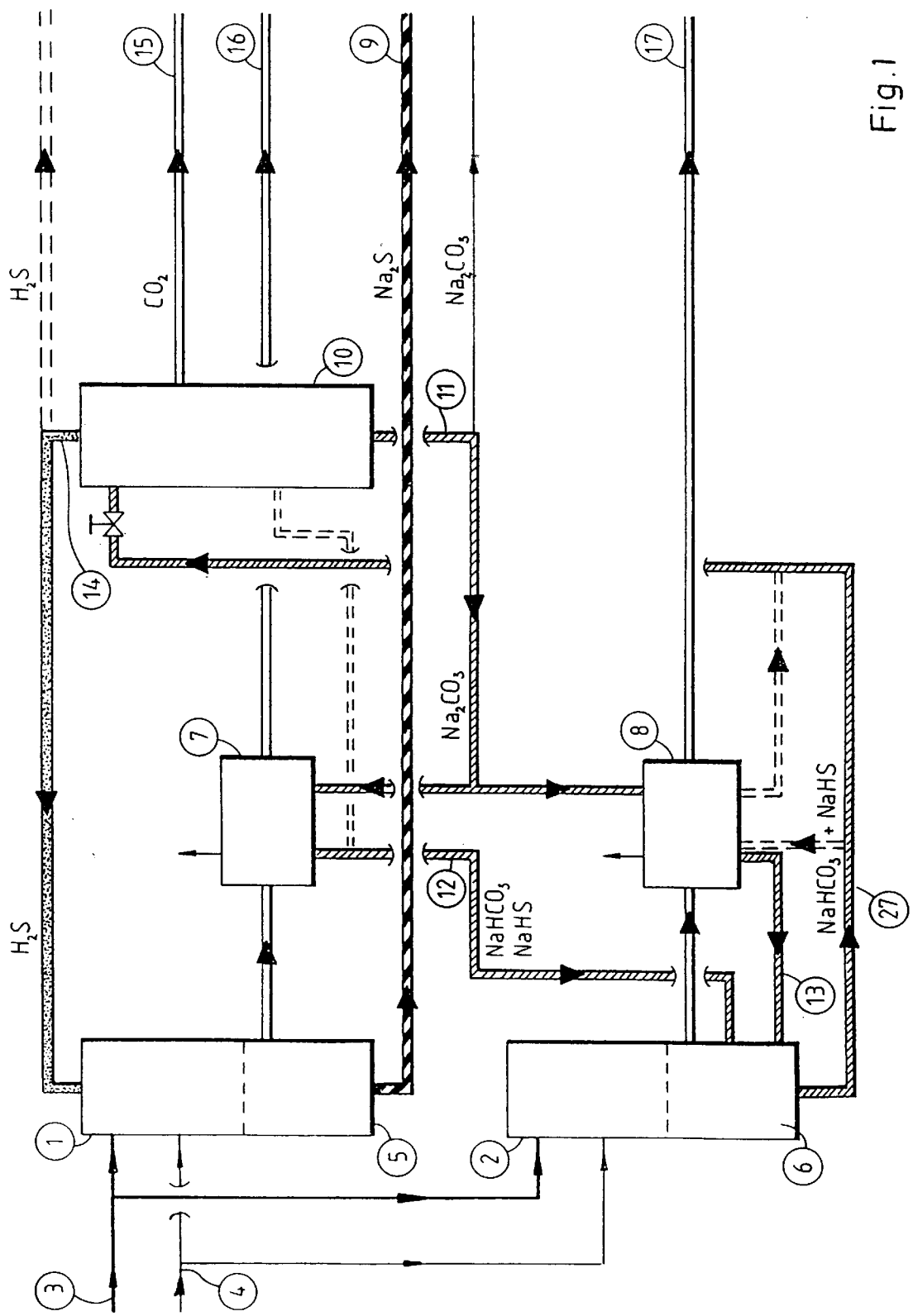
FIG. 1 illustrates a block diagram of a preferred embodiment according to the present invention.

The present invention provides a flexible process by which it is possible to influence the reaction conditions of the processes in the gasification reaction or in subsequent stages of treatment of the reaction products to produce liquors having different concentrations of valuable recovered process chemicals as desired. The different liquors can then be easily tailored for use at different points in the pulp production process. For example, in a preferred embodiment of the present invention, white liquors having different levels of sulphidity can be produced directly. In this manner, the need for causticizing and lime sludge reburning, which was necessary in earlier processes, is minimized or completely obviated, because the process according to the present invention can involve a form of auto-causticizing, as explained below.

For example, a spent liquor from the pulp mill, preferably the black liquor from a pulp digester, can be conveyed to a recovery installation where it is divided between two or more gasification reactors. The gasification reactors are preferably of the Chemrec® type. Preferably, the spent liquor is first concentrated, for example by evaporation. The spent liquor is gasified in the reactors to form high-energy combustion gasses. The combustion gasses produced comprise one or more of the following components: carbon monoxide, carbon dioxide, methane, hydrogen and hydrogen sulphide. The combustion gasses also comprise inorganic chemicals in solid form or in the form of small drops of smelt, comprising one or more of the components sodium carbonate, sodium hydroxide and sodium sulphide.

The resulting mixtures of combustion gas and smelt drops from each of the reactors can be quickly cooled in treatment devises, usually quench vessels, by direct contact with an aqueous cooling liquid and/or, in certain embodiments, the liquor which is formed when the smelt chemicals are dissolved in the aqueous cooling liquid. The combustion gasses can be purified and thereafter washed in one or more gas treatment devices. The liquors which are formed when some of the reaction products are dissolved in the aqueous cooling liquids are preferably collected in respective liquor treatment devices which are connected directly to each reactor and which can be of the liquid bath/quench type. Alternatively, instead of having separate liquid baths for each reactor, some or all of the reactors can be connected to a common liquid bath for collecting the liquor.

It has now been found that the process conditions in the reactors can be adjusted according to the present invention using recovered process chemicals. In particular, process chemicals can be recovered selectively, from the combustion gas and/or liquor which is formed, which can be used to influence the course of the process in one or more units in the recovery installation to thereby form liquors having different concentrations of process chemicals and/or combustion gasses containing different concentrations of process chemicals. Thus, according to one embodiment of the present invention, at least one process chemical can recovered, preferably by means of one or more absorbers and strippers, from one or more of the liquors originating from the gasification reactors or from one or more the combustion gasses. The process chemical, originating from the liquor(s) and/or combustion gas(ses), can then be returned, either in whole or in part, to one or more gasification reactors and/or to one or more devices for treatment of the combustion gas(ses), the solid and/or smelt inorganic materials from the reactors, or the liquor(s) produced therefrom as a means for differentiating the liquors and/or combustion gasses produced in the reactors. In this manner, liquors containing different concentrations of process chemicals and/or combustion gasses containing different concentrations of process chemicals can be produced from the same spent liquor.

A preferred embodiment in this case is that the unit or units to which the recovered process chemical is returned comprises the gasification reactors, liquid baths/quenchers connecter to the reactors, or the devices for purifying and washing the combustion gas. The most preferred embodiment is that the recovered process chemical comprises $H_2S$ and that this is returned to one or more gasification reactors in order to be present during the thermal decomposition of the spent liquor, so that the reaction equilibrium (a) is driven toward increased production of $Na_2S$. Sulphur additionally has a higher affinity toward sodium than it does toward carbon dioxide, for which reason the proportion of $Na_2S$ is increased and the proportion of $Na_2CO_3$ decreased. In each reactor, the gasification reaction can be controlled by adjusting the quantity of returned $H_2S$, in such a way as to produce liquors having the desired qualities. For example, in this manner, a liquor containing almost any concentration of $Na_2S$ can be produced. A liquor containing almost 100% $Na_2S$ can even be produced, if desired. Such a liquor can then be mixed, if appropriate, with causticized $Na_2CO_3$, (NaOH),, to provide the desired quality.

The temperature in the reactor in this case usually remains in the lower region of temperature ranges described below. However, this reactor can also operate at relatively high temperatures and pressures, even though a compressor may then required for supplying recovered $H_2S$. It is therefore conceivable that both of the reactors can operate at the same pressure and temperature. If this is the case, different process conditions can be established in each of the reactors by supplying one or more process chemicals, that are recovered selectively from the liquor and/or the combustion gas, to one or more of the reactors. Preferably, the reactor or reactors being supplied with the recovered process chemical is different from the reactor that the recovered process chemical originated from. A further variant is that the supply of the recovered process chemical can be effected in a crosswise manner. In this case, process chemicals are recovered from the liquor and/or combustion gas from the first reactor and are thereafter supplied in whole or in part to a second reactor, at the same time as process chemicals are recovered from the liquor and/or combustion gas from the second reactor and are thereafter supplied in whole or in part, to the first reactor.

It has also now been found that the reaction conditions in the reactors can be adjusted to thereby form liquors having different concentrations of process chemicals and/or combustion gasses containing different concentrations of process chemicals by varying the temperature and/or pressure in the reactors. Thus, another embodiment of the present invention includes operating at least one reactor at a pressure and/or a temperature differing from the pressure and/or temperature in another reactor such that the liquor produced and/or combustion gas produced in the first reactor contains a different concentration of process chemicals than the liquor or combustion gas produced in the second reactor.

Based on the disclosure provided herein, one skilled in the art will be able to adjust the operating temperature and/or pressure in each of the reactors to provide the desired concentration of process chemicals in each of the combustion gasses and/or liquors produced therefrom. For example, as explained in more detail below, as the temperature in the reactor is raised, the equilibrium reaction (C) below is driven to the right, which makes the liquor formed in the quench vessel more alkaline. When sufficient contact between the alkaline liquor and carbon dioxide in the combustion gas is provided, $HCO_3^-$ and $HS^-$ are formed in the liquor, resulting in a green liquor. Thus, a reactor having a higher operating temperature than a second reactor can produce a liquor containing a higher concentration of $HCO_3^-$ and $HS^-$ than that of the liquor formed in the reactor having the lower operating temperature.

Examples of suitable operating temperatures for the reactors have been found to be from about 500 to about 1600 °C., preferably about 700 to about 1300° C., and more preferably about 800 to about 1000 °C. When temperature is used as the principal means for differentiating the liquors and/or combustion gasses produced in the reactors, preferably the temperature differential between the reactors is about 50 to about 250° C., more preferably about 75 to about 150° C.

Examples of suitable operating pressures for the reactors include from about 1 to about 150 bar, and preferably about 1 to about 50 bar. When pressure is used as the principal means for differentiating the liquors and/or combustion gasses produced in the reactors, preferably the pressure differential between the reactors is about 1 to about 50 bar, more preferably about 10 to about 40 bar. Thus, for example a first reactor can be operated in a pressure range of from about 1 to about 10 bar, preferably about 1 to about 4 bar, and a second reactor at about 20 to about 50 bar to provide different concentrations of process chemicals in the liquors or combustion gasses produced.

A preferred embodiment of the present invention will now be explained in detail with reference to the attached Figures. Reference number 1 and reference number 2 in FIG. 1 each separately indicate a pressure vessel comprising a ceramically lined gasification reactor. Each reactor is provided with an inlet 3 for black liquor and an inlet 4 for oxygen or oxygen-containing gas, as well as a burner (not shown).

In both the reactors, the black liquor is decomposed thermally under substoichiometric conditions. The oxygen supply can be from almost 0 up to about 80%, preferably up to about 60%, of the stoichiometric amount of oxygen required for complete oxidation of the organic and inorganic substances present in the reactor. Each reactor is connected to a respective quench vessel, shown at 5 and 6. The quench vessels each contain a pool of aqueous cooling liquid that comprises a liquor which is formed when the resulting mixture of gas and smelt from the respective reactor is cooled by direct contact with an aqueous cooling liquid. The combustion gas outlet of each quench vessel is connected to a respective gas treatment unit, shown at 7 and 8, for purifying and washing the combustion gasses 16 and 17, respectively.

Figure 2:
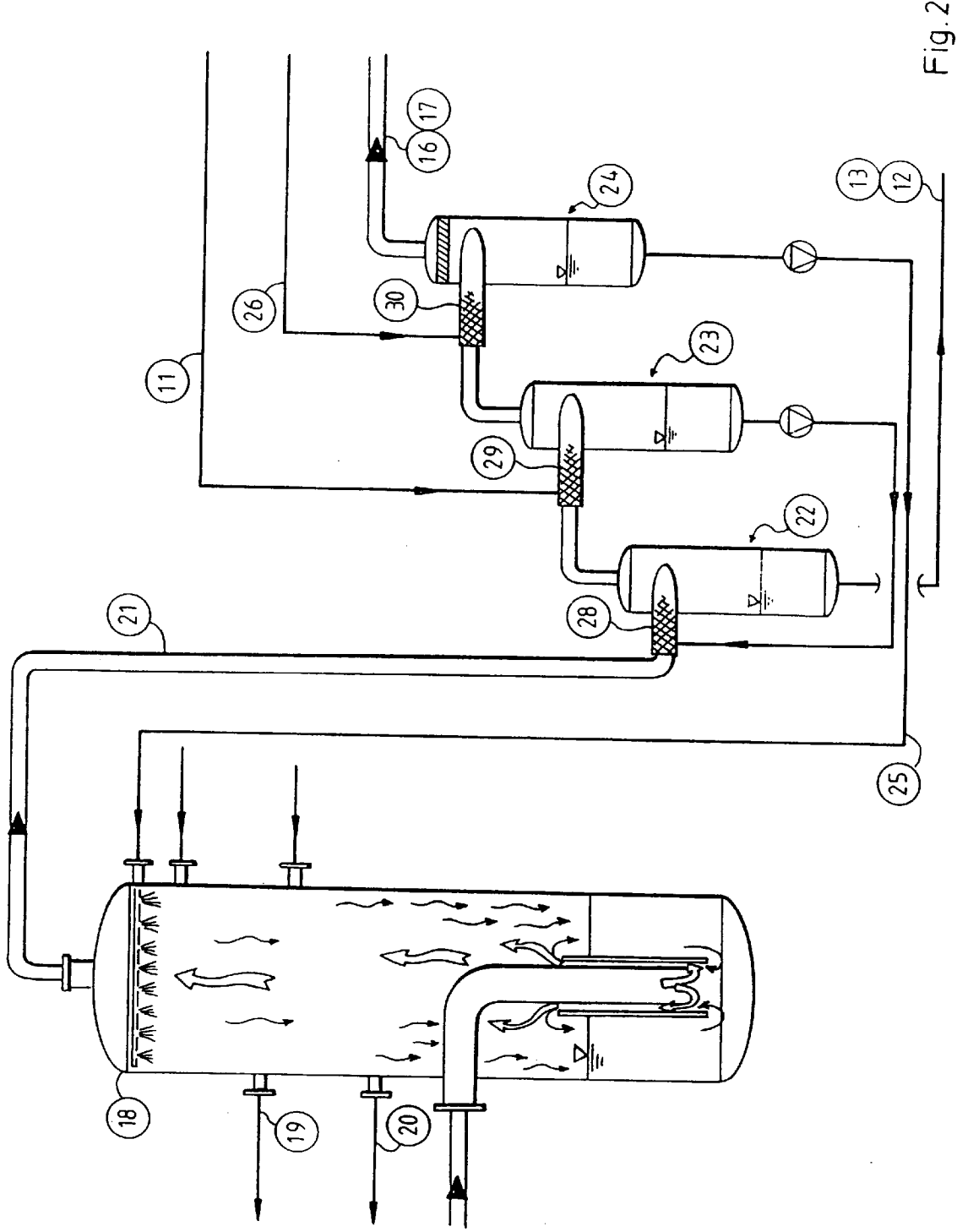
FIG. 2 illustrates a preferred embodiment of the gas treatment units shown in FIG. 1.

A preferred structure of the gas treatment units 7 and 8 is shown in more detail in FIG. 2. The combustion gas which leaves the gas treatment units can be used as a fuel for generating steam and/or electrical power. The physical thermal value of the gas can also be used for generating hot water and/or steam. Alternatively, a process chemical(s) can be recovered from the combustion gas.

Gasification reactor 1 operates at a relatively low pressure, on the order of about 1.5 to about 4 bar absolute with a high partial pressure of $H_2S$. This means that the reaction equilibrium (a), in accordance with the same principle as given in SE-B468 600, is displaced to the right so that the formation of $Na_2CO_3$ in the solid or smelt phase is suppressed in favor of the formation of $Na_2S$. Intensive contact between the combustion gas formed in reactor 1, with its $CO_2$ content, and the liquor formed when smelt drops and hydrogen sulphide are dissolved in the cooling liquid is avoided as much as possible. Preferably, the quench vessel 5 is designed in accordance with the reactor quench which is described in SE-AO-9402197, with the outlet from the reactor preferably comprising a dip-tube in which aqueous cooling liquid is sprayed directly adjacent to the hot gas outlet through a number of nozzles for maximum contact with the smelt/gas mixture. If desired, the aqueous cooling liquid can be substitute with another suitable liquid, although a water based liquid is preferred. The aqueous cooling liquid is partially vaporized upon contact with hot gas and smelt at the reactor temperature. The smelt is dissolved in the remaining part of the cooling liquid and in this way forms a liquor which falls down into the pool of aqueous liquid in the quench vessel 5. Alternatively, the smelt falls in the form of drops directly down into the pool of aqueous liquid in the quench vessel 5 and only then is dissolved therein to form liquor. The pool of aqueous liquid in the quench vessel 5, thus, comprises liquor. The cooling of the smelt drops then takes place by vaporization of water in the pool of aqueous liquid.

Preferably, the dip-tube opens out immediately above the liquid level in the pool of aqueous liquid in the quench vessel 5. This is important in order to avoid intensive contact between the combustion gas and liquor present in the aqueous liquid. If the dip-tube opens out below the surface of the aqueous liquid, the combustion gas will be forced to flow through the aqueous liquid, with the result that reactions between combustion gas and the liquor may take place. By using the reactor and quench as described in the preferred embodiments, the liquor 9 issuing from reactor 1 can contain substantially 100% $Na_2S$, dissociated as NaHS and NaOH, which can be a green liquor. This green liquor may also be used directly as a white liquor without the need for causticizing the . Furthermore, the present invention provides a flexible process for making white liquors having the desired concentrations of NaHS and NaOH directly, and in some cases without the need for causticizing the green liquor.

Figure 3:
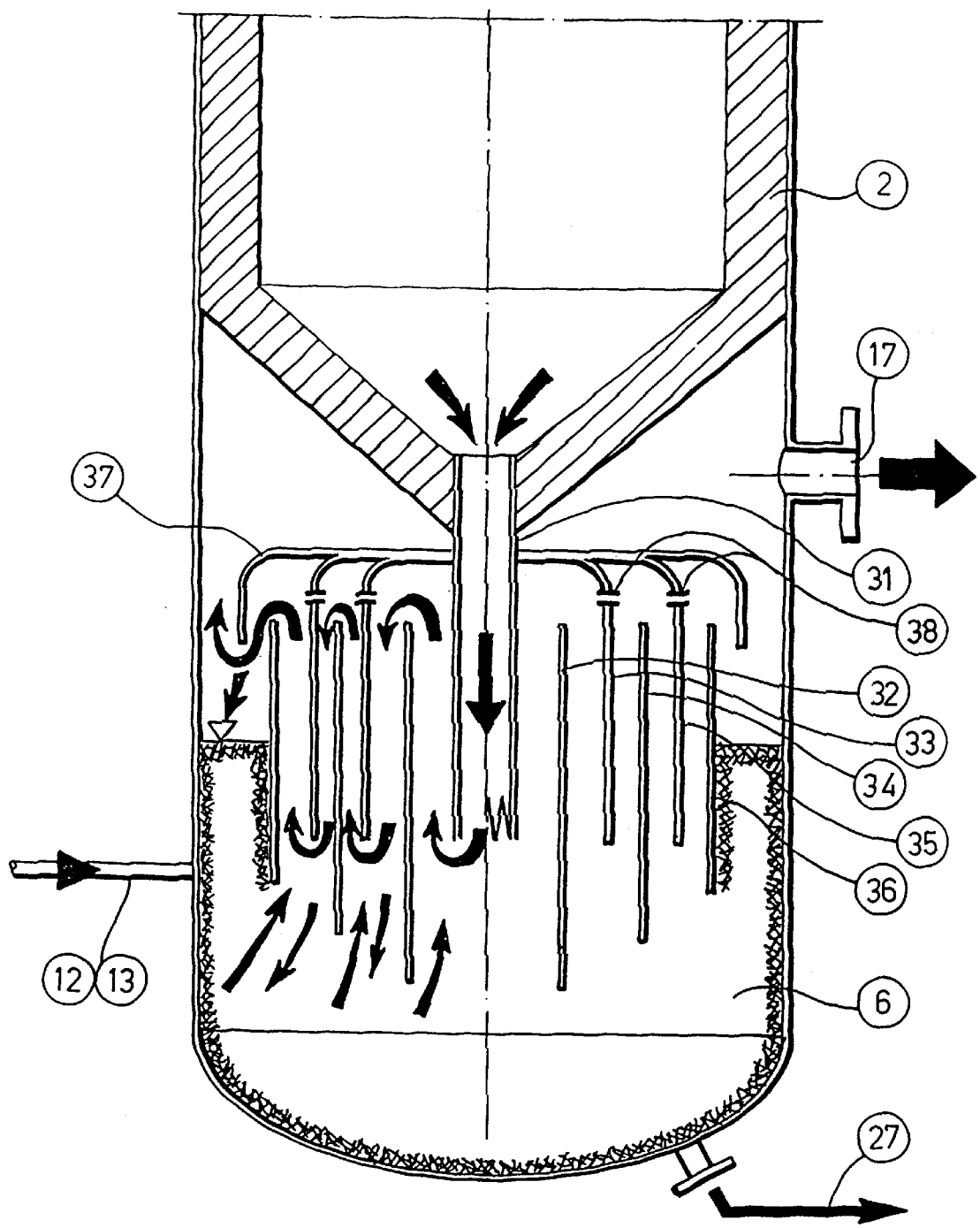
FIG. 3 illustrates a preferred embodiment of a liquid bath/quench suitable for use in the present invention.

Gasification reactor 2 operates at a comparatively higher pressure than reactor 1, on the order of 25 bar absolute. Consequently, the pool of aqueous liquid in the quench vessel 6 has a higher temperature than that of the pool of aqueous liquid in the quench vessel 5 belonging to reactor 1. The aqueous liquid in the quench vessel 6 is designed for maximal intensive contact between the combustion gas formed in reactor 2, particularly the content of $CO_2$ and $H_2S$, and the liquor which is formed when smelt drops and hydrogen sulphide are dissolved in the pool of aqueous liquid. This is achieved by the dip-tube from the reactor being designed for optimal contact between the combustion gas and the liquor present in the pool of aqueous liquid in the quench vessel 6. The dip-tube is preferably constructed in such a way that it opens out under the surface of the pool of aqueous liquid in the quench vessel 6, as a result of which the combustion gas is forced to flow intensively through the pool of aqueous liquid. A preferred embodiment of the quench vessel 6 is shown in FIG. 3. Because the temperature in the quench vessel is high and the contact between gas and aqueous liquid is very good, a high proportion of $HCO_3^-$ and $HS^-$ ions can be formed in the liquor present in the pool of aqueous liquid in accordance with reactions (b)–(f) below:

Sodium carbonate in the liquor is dissociated:

$$Na_2CO_3 \rightarrow 2Na^+ + CO_3^{2-} \quad (b)$$

$CO_3^{2-}$ and $HCO_3^-$ are included together in the acid/base equilibrium:

$$CO_3^{2-} + H_2O \rightarrow HCO_3^- + OH^- \quad (c)$$

This equilibrium reaction (c) is displaced to the right as the temperature is increased. In other words, as the temperature is increased the aqueous liquid becomes more alkaline.

At very good contact between carbon dioxide and liquor, the following consecutive reactions subsequently occur:

$$2OH^- + CO_2 \rightarrow CO_3^{2-} + H_2O \quad (d)$$

$$CO_3^{2-} + CO_2 + H_2O \rightarrow 2HCO_3^- \quad (e)$$

Carbonate ions in the liquor additionally react with the hydrogen sulphide in the combustion gas:

$$CO_3^{2-} + H_2S \rightarrow HCO_3^- + HS^- \quad (f)$$

Consequently, in the quench vessel 6, a carbonation of the liquor takes place to provide a significantly increased content of hydrogen carbonate and hydrogen sulphide ions. This quench vessel 6 can additionally be supplied with $NaHCO_3$ and NaHS, shown at 12 and 13 respectively, from the gas treatment units 7 and 8 of the two reactor lines. This is also a form of return of process chemicals in accordance with a concept of the invention.

The gas treatment units 7 and 8 are supplied with liquor 11 which is low in sulphide and principally consists of $Na_2CO_3$. This has a good absorption capacity for the $H_2S$ and $CO_2$ content of the combustion gas.

The liquor 27 from the carbonation quench 6 containing high levels of $NaHCO_3$ and NaHS at high temperature and high pressure can be pumped to a stripper 10 for expansion and selective driving-off of $H_2S$, shown at 14, and $CO_2$, shown at 15. At the inlet to the stripper, the pressure is lowered from approximately 25 bar to approximately 2–5 bar (absolute) in the preferred case.

$H_2S$ is in this case the first to be driven off as follows:

$$NaHS + NaHCO_3 = H_2S + Na_2CO_3 \quad (g)$$

Carbon dioxide requires a longer dwell time to be driven off and, if appropriate, a second digester coupled to the stripper, and it is driven off as follows:

$$2NaHCO_3 \rightarrow Na_2CO_3 + CO_2 + H_2O \quad (h)$$

The remainder of the liquor, principally $Na_2CO_3$, is pumped from the bottom part of the stripper and, in accordance with the concept of the invention, is returned at least in part in the stream 11 to the gas treatment units.

The fact that carbon dioxide can be driven off selectively means that the invention, in accordance with this embodiment, involves a form of auto-causticizing. If the preconditions for this auto-causticizing are made sufficiently effective, or if some of the $Na_2CO_3$ can be used, as appropriate, at another point in the pulp process, for example for the pre-impregnation of the chips, the usual causticizing process for converting $Na_2CO_3$ to NaOH, including the lime sludge reburning, can be minimized or completely obviated. An alternative utilization of virtually sulphur-free $Na_2CO_3$ is to causticize it to NaOH, which can be used, for example, in bleaching.

As an alternative to using the gas treatment unit according to FIG. 2, a conventional absorber/stripper system can be used. In this case it is preferable to use only one absorber, to which essentially all the combustion gas and liquor 27, with a high content of $NaCO_3$ and NaHS, as well as low-sulphide liquor 11, are conveyed. Liquor issuing from the absorber is conveyed onward to a stripper where the pressure is lowered so that $H_2S$ and $CO_2$ are driven off. The absorber/stripper system can also be supplemented, if so desired, with a quench having good gas/liquid contact as well as a condenser 18.

Another alternative embodiment is to use the pre-impregnation vessel or the like of the cooking department as the stripper 10. The chip column in this case will act as packing material. This concept has the advantage that encrustation of the packing material is avoided, at the same time as pre-treatment of the chips with $H_2S$ and $Na_2CO_3$ is achieved. Such pre-treatment of the chips also greatly improves the cooking result.

As an alternative to using strippers for driving off $H_2S$ and $CO_2$, it is possible to use a system with stepwise flashing or expansion. It is in this case preferable for the concluding expansion stage, for driving off $CO_2$, to be carried out at a low pressure, for example 0.5 bar absolute, in which case the issuing liquor obtained is of higher concentration and lower temperature.

If appropriate, one or more of the desorption towers, for example with Linder bases or structured packing, can also be used for the driving-off.

$H_2S$ which has been driven off can be returned in a stream 14 to gasification reactor 1 in order to generate an increased partial pressure of $H_2S$ so that the equilibrium reaction in the reactor is driven towards increased formation of $Na_2S$ in accordance with reaction (a). Preferably, substantially all of the $H_2S$ which has been driven off is supplied to the reactor 1.

Some of the $H_2S$ from the stream 14 can optionally be used for direct admixture to the sulphide-rich liquor 9 if even greater sulphidity is desired.

A high partial pressure of hydrogen sulphide in one or more gasification reactors can also be created by the addition of an external sulphur source or the use of recovered $H_2S$ supplemented with an external source. For example, petroleum coke with a content of 3 to 6% sulfur can be supplied to the reactor. This coke additionally constitutes a substantial addition of fuel of high thermal efficiency. In the case of addition of external sulphur, the latter is expediently recovered in whole or in part as $H_2S/SO_2$ or elemental sulphur, for example by using the well-known Claus process.

The Claus process can also be used to produce elemental sulphur from the stream 14 which has been separated off. It may be expedient to do this if there is insufficient selectivity in respect of the separation. In this case, sulphur is returned in elemental form to the black liquor or directly to the reactor at a high $H_2S$ partial pressure.

If the first reactor is operating at a lower pressure than the second one, it may be expedient to use a combined cycle concept with a single flue gas outlet for recovering energy from the combustion gases. The combustion gas at higher pressure is in this case conveyed to a gas turbine, and the exhaust gas from this, containing about 12 to about 15% oxygen at a temperature of approximately 550° C., can be used as combustion air in a gas boiler. The fuel for the gas boiler can be the combustion gas at lower pressure.

Reference number 18 in FIG. 2 indicates a gas treatment device in the form of a tower in accordance with what is described in SE-AO-9402197 and comprises of a quench (liquid bath) and an indirect cooler, preferably a countercurrent falling-film condenser, for washing gas and recovering energy from hot moisture-saturated combustion gas. Gas treatment in this tower results in the production of hot water 19 and steam 20. The pressure of the steam which can be produced is determined by the temperature and system pressure in the associated quench. The combustion gas 21 is conveyed, following treatment in the tower 18, to further gas treatment devices 22, 23 and 24. The gas is purified there, and at the same time the $H_2S$ content absorbed, in a number of scrubber stages which are connected in series and which preferably comprise a static mixer 28, 29 and 30 or venturi scrubber. In the first scrubber stages, low-sulphide liquor 11, principally comprising $Na_2CO_3$, is used as wash liquid. In the last stage, pure water 26, if appropriate deionized, is preferably used as wash liquid. Liquid 25 issuing from this stage can be supplied to the gas treatment tower 18 for maintaining the liquid balance in the system.

A separate gas treatment unit with tower 18 and separate scrubber stages 22, 23 and 24 is preferably connected to each reactor 1 and 2.

FIG. 3 shows a possible embodiment of a liquid bath/quench 6 for providing intensive contact between the combustion gas formed in reactor 2, particularly the $CO_2$ and $H_2S$ content, and the liquor which is formed when smelt drops and hydrogen sulphide are dissolved in the cooling liquid. Reference number 31 indicates a dip-tube which opens out below the surface of the liquid. Arranged concentrically around the dip-tube are a number of cylindrical partition walls 32, 33, 34, 35, 36, the lower ends of which are located within the pool of aqueous liquid. A diverter screen 37 is joined to the upper part of the downpipe, that is to say above the liquid surface. Every other partition wall 33, 35, hereinafter referred to as a diverter wall, is secured at the upper end, in a gas-tight manner, to this diverter screen, while the remaining partition walls 32, 34, 36 are arranged with an opening between the partition wall and the diverter screen. These latter partition walls 32, 34, 36 extend further down in the liquid bath than the diverter walls 33, 35. In addition, they are of progressively decreasing length as seen from the center outwards. By means of this design, the combustion gas, when it leaves the dip-tube, is forced to flow through the pool of aqueous liquid several times over, as it is forced up and down through the spaces between the partition walls in order finally to be transferred 19 outlet 17 for further gas treatment, shown at 8. The use of the term "diverter" is herein understood to include a partition wall and a diverter wall. For example partition wall 32 and diverter wall 33 make up one diverter which forces the combustion gas to flow down into the liquid pool.

Despite the fact that the diverter walls 33, 35 are secured in a gas-tight manner to the diverter screen 37, it is preferable if a small amount of gas can be passed through the wall, at its upper end, via one or more small holes 38. This avoids the build-up of excessively large and more or less stationary volumes of gas close to the diverter screen.

The design of the quench vessel according to FIG. 3 may also be used in conjunction with other processes for gasification of spent liquor, that is to say processes not directly related to this invention, if good gas/liquid contact is desired.

The above processes have been described in detail with sodium as base, but the similar positive advantages can be obtained in a process with, for example, potassium as base. The above process has also been described in detail with reference to the use of black liquor as the spent liquor. However, the principle can also be applied to a gasification process using another type of reactor design or using other types of spent liquors, for example spent bleaching liquors, spent liquors from the production of semi-chemical pulp (for example CTMP), etc. The term spent liquor is used to refer to what in more modern terminology may be called return liquor.

EXAMPLE

The following table shows the balance for a recovery installation having two reactors in accordance with a preferred embodiment of the present invention. The first reactor is operated with a supply of recovered corresponding to 4–6 times incoming sulphur amount present in black liquor and with a minimized contact between the combustion gas and the liquor present in the quench pool. The second reactor operates with good contact between combustion gas and liquor present quench pool. The $H_2S$ supplied to the first reactor is recovered from the combustion gas produced in the second reactor.

The balance is based on incoming black liquor containing 1800 kg dry substance.

|  | Reactor line 1 | Reactor line 2 | Unit |
| --- | --- | --- | --- |
| Dry substance | 610 | 1190 | kg |
| Reactor pressure | 1.5–4.0 | 25 | bar (a) |
| Energy value, gas | 1050 (gas boiler) | 2650 (gas turbine) | kW |
| $Na_2S$ in formed liquor | 190 | — | kg |
| $Na_2CO_3$ in formed liquor | 12 | 545 | kg |
| NaOH in formed liquor | 6 | — | kg |

As can be seen from Table 1, the present invention is capable of producing very different liquors from the same spent liquor. This type of flexibility provides a significant advantage over conventional methods of recovering process chemicals from a spent liquor.

The present invention makes it possible to maintain different reaction equilibriums in different reactors. This means especially that a liquor which is particularly rich in sulphide can be produced for use as cooking liquid in the initial stage of pulp cooking. High sulphidity during the initial delignification has been stressed, by the Swedish Forest Products Research Laboratory among others, as being an important precondition for selective kraft pulp cooking.

Another advantage is that a large part of the available sodium can be bound as $Na_2S$ to the sulphur which is present in the production of sulphide-rich liquor. This reduces the formation of sodium carbonate, which has to be causticized for cooking liquid to be obtained.

A small amount of the sodium carbonate produced can be used, if appropriate, during pre-impregnation of the chips prior to cooking.

Another important advantage is that the lime consumption is considerably reduced, compared to the consumption in the case of conventional black liquor gasification, since the invention involves a form of auto-causticizing. Conventional types of black liquor gasifiers otherwise result in a greater consumption of lime than does the normal recovery boiler process. This is due to the fact that effective alkali which has been obtained during the smelt dissolution, or which has been supplied together with weak liquor, is consumed upon contact with the $CO_2$ and $H_2S$ content of the gas. Both carbonate and hydrogen carbonate are thereby formed, which must be causticized to hydroxide, which consumes lime.

In black liquor gasification at a high system pressure, the proportion of sulphur in the combustion gas in the form of $H_2S$ increases. This is normally absorbed by some form of alkali, for example $Na_2CO_3$. Hydrogen carbonate is also formed in this case, which consumes lime in conjunction with subsequent causticizing. Calculations demonstrate that black liquor gasification in accordance with the previously known design consumes about 100% more lime than does the recovery boiler process. By using the present invention, the consumption of lime is by contrast about 10% less than in the recovery boiler process.

An energy-related advantage is that the energy which is evolved when $Na_2S$ is dissociated to NaHS and NaOH in the quench of the first reactor can be recovered in the production of hot water and steam. In the quench of the second reactor, the absorption energy can be used in a corresponding manner for reactions (e) and (f) above.

While the invention has been described in detail and with reference to specific embodiments thereof, it will be apparent to those of ordinary skill in the art that various changes and modifications can be made to the claimed invention without departing from the spirit and scope thereof.

What is claimed is:

1. A quench vessel for forming a liquor from combustion products of a spent liquor, said quench vessel comprising:
   a vessel structure defining an interior chamber for containing a pool of liquid comprising a liquor;
   a dip-tube having an open end disposed a set distance below a surface of the pool of liquid for suppling a combustion gas from a reactor to the pool of liquid; and
   at least one diverter being constructed and arranged such that said combustion gas flowing through said dip-tube flows up through and out of the pool of liquid and then is forced to flow back into and out of the pool of liquid by said diverter, said diverter comprising:
   a first wall structure generally adjacent to an outer surface of said dip-tube and having a first end extending more than said set distance below the surface of the pool of liquid and a second end extending above the surface of the pool of liquid, said first wall structure defining a space between said outer surface of said dip-tube and an inner surface of said first wall structure through which said combustion gas can flow upwardly, out of the pool of liquid and over said second end of said first wall structure, and
   a second wall structure generally adjacent to an outer surface of said first wall structure and having a first end extending less than a distance said first end of said first wall structure extends below the surface of the pool of liquid to define a space between said outer surface of said first wall structure and an inner surface of said second wall structure through which said combustion gas can flow from around said second end of said first wall structure and downwardly back into the pool of liquid, an upper portion of said second wall structure defining a surface for enclosing a gas space above said second end of said first wall structure between said outer surface of said dip-tube and an inner surface of said second wall structure.

2. A quench vessel according to claim 1, wherein said diverter is arranged concentrically around said dip-tube.

3. A quench vessel according to claim 1, further comprising a plurality of said diverters, wherein each succeeding wall structure of said diverters in a direction away from said dip-tube extends a distance less than a preceding wall structure into the pool of liquid.

4. A quench vessel according to claim 1, wherein said diverter surrounds said dip-tube.

5. A quench vessel according to claim 1, wherein said upper portion of said wall structure contains an opening to at least one of said interior chamber or a gas space in another diverter for allowing a portion of said combustion gas to flow there through and substantially avoid stagnant combustion gas above said second end of said first wall structure.

6. A quench vessel according to claim 1, wherein said dip-tube comprises a square tube, a substantially round tube, a polygonal shaped tube, or oval tube.

7. A quench vessel according to claim 3, wherein said diverters are arranged concentrically around said dip tube.

8. A quench vessel according to claim 3, wherein said quench vessel comprises three diverters.

9. A quench vessel according to claim 3, wherein said first and second wall structures are cylindrical.

10. A quench vessel according to claim 1, wherein said first and second wall structures are cylindrical.

* * * * *